May 8, 1951

L. T. CRABBE 2,552,407

TORQUE INDICATING DEVICE FOR CAPPING
MACHINES OF THE TURNING TYPE

Filed Jan. 25, 1950

INVENTOR
Lindsay T. Crabbe,

BY Mason, Porter, Diller & Stewart
ATTORNEYS

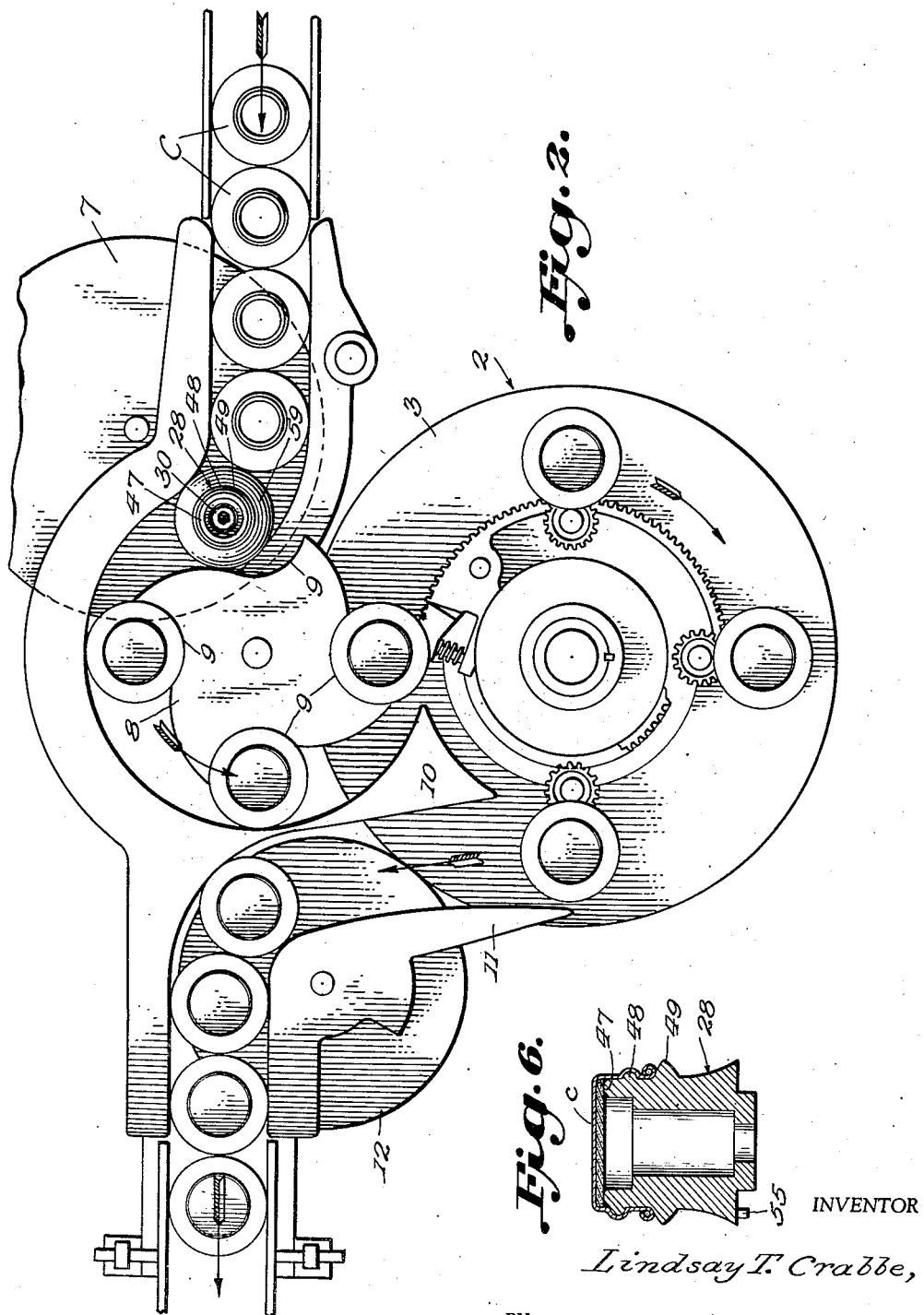

May 8, 1951 L. T. CRABBE 2,552,407
TORQUE INDICATING DEVICE FOR CAPPING
MACHINES OF THE TURNING TYPE
Filed Jan. 25, 1950 4 Sheets-Sheet 3
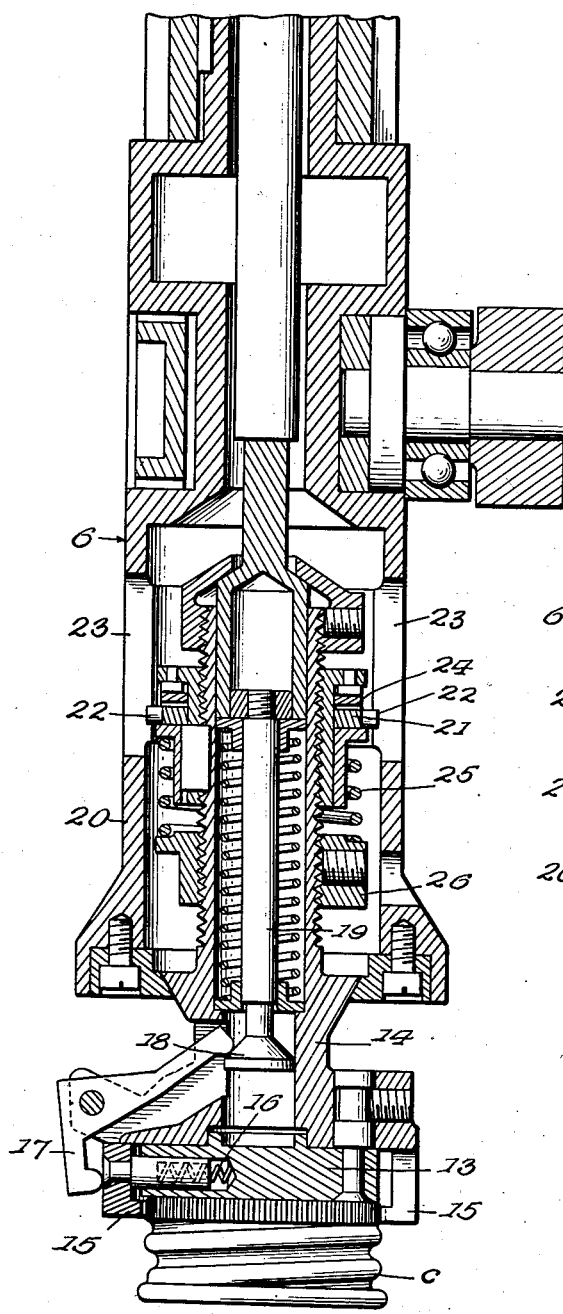
Fig. 2ª
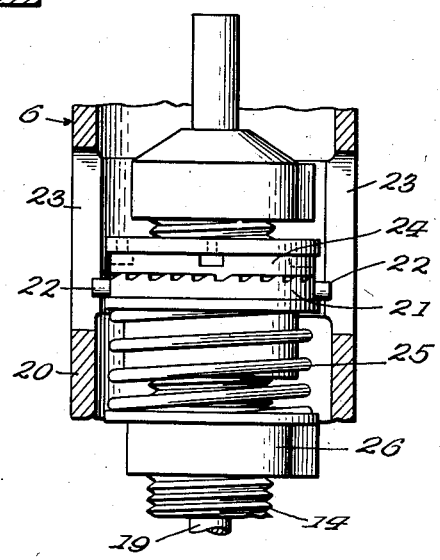
Fig. 2ᵇ
INVENTOR.
Lindsay T. Crabbe,
BY
Mason, Porter, Diller & Stewart
ATTORNEYS May 8, 1951    L. T. CRABBE    2,552,407
TORQUE INDICATING DEVICE FOR CAPPING
MACHINES OF THE TURNING TYPE
Filed Jan. 25, 1950    4 Sheets-Sheet 4

INVENTOR
Lindsay T. Crabbe,

BY Mason, Porter, Diller & Stewart
ATTORNEYS

Patented May 8, 1951

2,552,407

UNITED STATES PATENT OFFICE 2,552,407

TORQUE INDICATING DEVICE FOR CAPPING MACHINES OF THE TURNING TYPE

Lindsay T. Crabbe, Chicago, Ill., assignor to Phoenix Metal Cap Co., Inc., Chicago, Ill., a corporation of New York Application January 25, 1950, Serial No. 140,441

5 Claims. (Cl. 73—136)

The invention relates to new and useful improvements in a torque indicating device for a capping machine of the screw or lug type. The tightness to which the cap of the screw or lug type is applied to a container is a very important factor. It should be applied as tightly as is necessary to prevent leakage and yet not to a tightness that will distort a container top, the threads, or to make removal of the cap too difficult for the ultimate consumer.

There is no means in the commercial capping machines or associated therewith, for indicating the inch pounds of torque under which a cap head is operating when turning a cap onto a container. Therefore, it is difficult to adjust the several heads of a multiple spindle capping machine so as to obtain a uniformity of tightness in all of the caps applied by the machine. Neither has it been possible to determine whether or not such uniformity of tightness is maintained through a day's operation.

An object of the present invention is to provide a device or instrument which will enable each cap applying chuck to be adjusted so as to apply a predetermined uniform tightness to each cap applied by the capping machine.

A further object of the invention is to provide a device or instrument of the above type that can be passed through the machine at any time in place of a container and record the turning torque at which the capping head is operating.

A still further object of the invention is to provide an instrument of the above type wherein a torque indicating pointer is moved to a set indicating position by the capping head and remains in said position after removal from the machine, and until manually returned to initial or zero position.

A further object of the invention is to provide a method of recording the turning torque at which the heads of an automatic multiple spindle capping machine are operating when turning caps onto containers.

These and other objects will in part be obvious and will in part be hereinafter more fully disclosed.

In the drawings, which show by way of illustration one embodiment of the invention and the method of using the same;

Figure 2 is a view indicating more or less diagrammatically and in plan the line of travel of the containers through the multiple spindle capping machine with the improved torque indicating device substituted for one of the containers;

Figure 3:
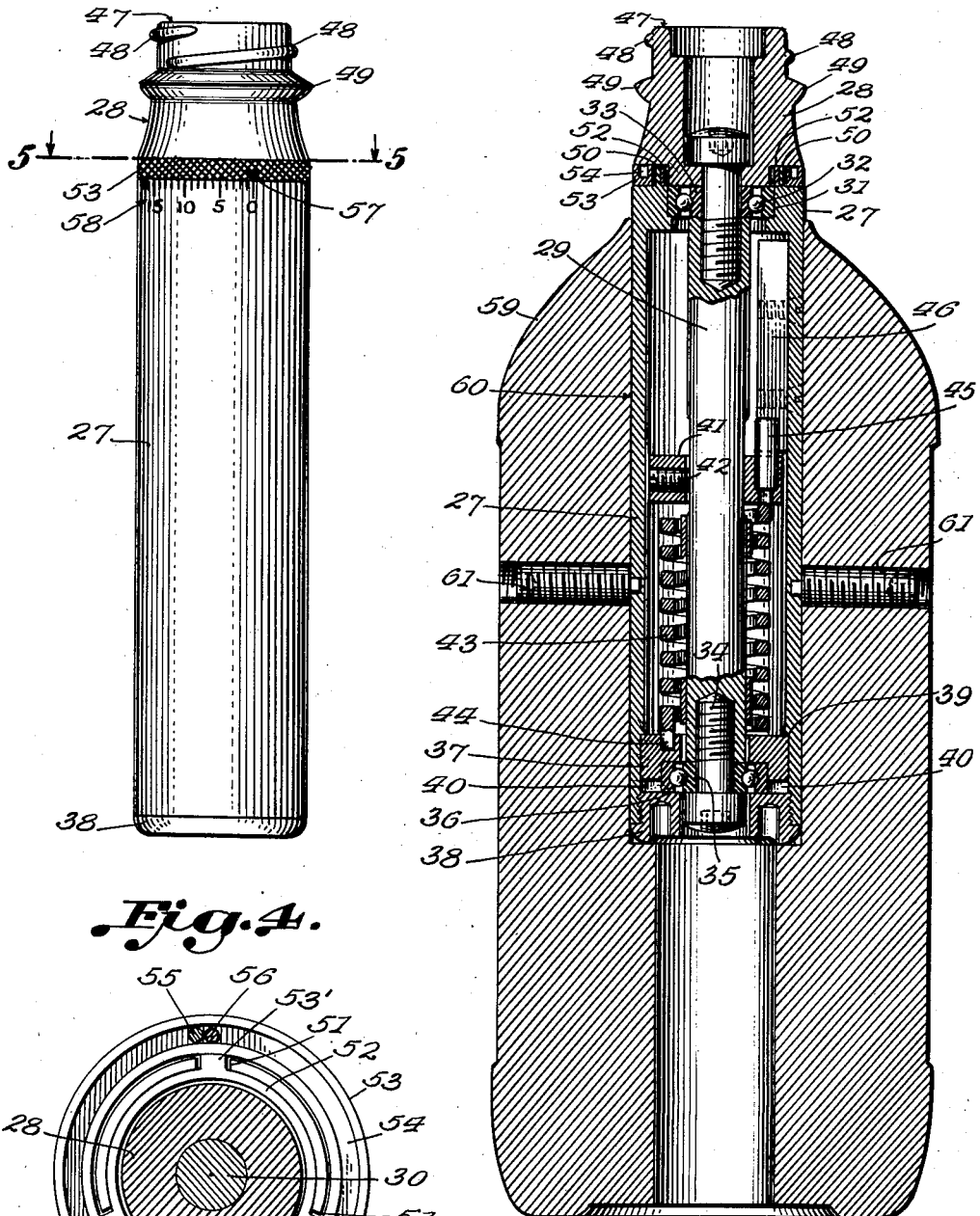
Figure 5:
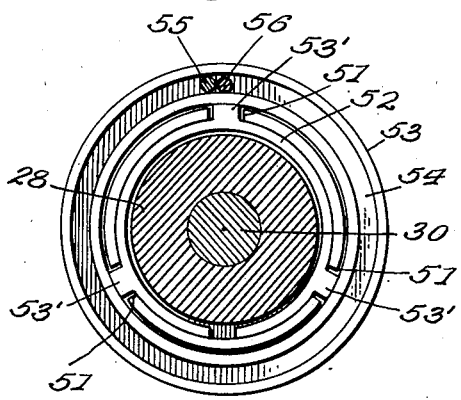

Figure 2ª is a sectional view through the lower portion of one of the cap applying units;

Figure 2ᵇ is an enlarged sectional view of the clutching mechanism for turning the chuck;

Figure 3 is a longitudinal sectional view of the improved torque indicating device mounted in a dummy so that it can take the place of a container and be passed through the capping machine;

Figure 4 is a side view of the torque indicating device removed from the dummy;

Figure 5 is a sectional view on the line 5—5 of Figure 4; and

Figure 6 is a view of the head of the torque indicating device showing a cap applied thereto.

A type of automatic multiple spindle capping machine has been illustrated in the drawings and will be described briefly to aid in the understanding of the improved torque indicating device and the method of employing the same in the adjustment of the capping chucks so as to obtain a uniformity in the tightness to which all caps are turned onto the containers by the capping machine.

Figure 1:
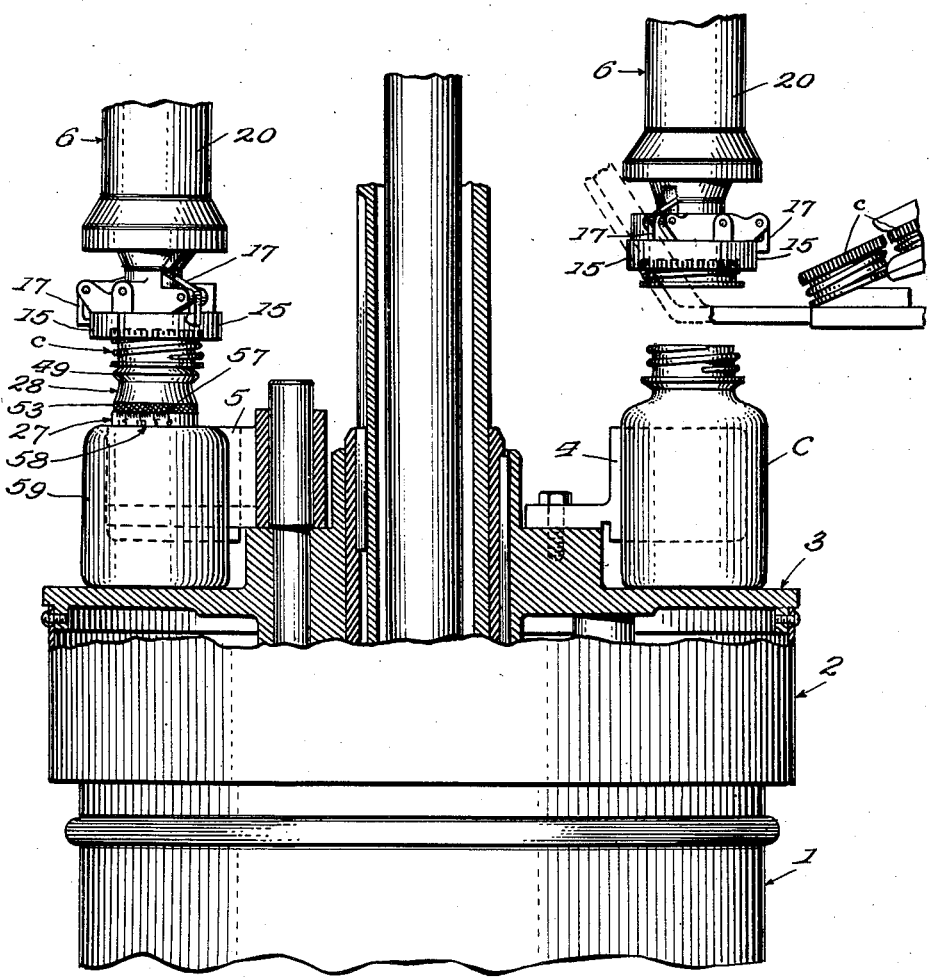
Figure 1 is a view showing more or less diagrammatically, and partly in section, a portion of a multiple spindle capping machine with one of the capping heads operating to attach a cap to the improved torque indicating device.

Only a few of the essential elements of a capping machine have been illustrated. The capping machine includes a supporting frame, a portion of which is indicated at 1 in Figure 1 of the drawings. Mounted on the frame is a rotating turret 2 having a flat supporting table 3 onto which the containers are moved. Mounted on the turret are clamping jaws 4 and 5. These jaws clamp the container and prevent the container from turning when the caps are applied thereto. Directly above these clamping jaws are the cap applying heads indicated at 6, 6. There are four of these capping heads and their relation to each other is indicated in Figure 2. The containers which are to be closed by a cap are indicated at C.

Referring to Figure 2, it is noted that the containers are fed by suitable means onto a rotating disk 7 and are carried by said disk into a star wheel 8 having pockets 9 which receive the containers and these pockets are spaced and the star wheel timed so as to place a container on the table between the clamping jaws, and the container is centered by the clamping jaws beneath the cap applying head. After the caps have been attached to the containers they are directed off from the turret by the guiding members 10 and 11 onto a rotating disk 12 which carries the containers out of the machine.

The cap applying head includes a gripping chuck 13 carried by a sleeve 14. Mounted on the chucking head are gripping jaws 15. These jaws are opened to receive the cap by springs 16 and are forced into engagement with the cap by levers 17 operated by a cam 18 carried by the rod 19. The cap is placed between the jaws and then the jaws are closed onto the cap so as to grip the same. The sleeve 14 carrying the chuck is rotated by the housing 20. There is a clutch member 21 freely mounted on the sleeve and having projecting lugs 22 adapted to slide up and down in grooves 23 in the housing. There is a second clutch member 24 which is fixed to the sleeve 14. A spring 25 bears against the clutch member 21 and forces it into frictional engagement with the clutch member 24. This spring rests on an abutment collar 26 carried by the sleeve 14. One of the opposing faces of the clutch member carries a plurality of teeth and the other carries two teeth. These two teeth engage the teeth on the driven member 21 of the clutch. Further and more detailed description of this capping head is found in a patent granted to Tiano No. 2,106,365, January 25, 1938.

In the operation of this cap applying head the cap is turned onto the container until a certain tightness has been obtained and then the clutch will slip. The tension of the spring closing the clutch may be varied by screwing the abutment collar 26 up or down on the sleeve supporting the same and thus the turning torque applied to the cap for turning it onto the container may be adjusted until just the right tightness is obtained so as to prevent leakage and at the same time to permit the removal of the cap without difficulty by the ultimate consumer. There is no means for determining the torque which is applied to the turning of the cap at the time when the clutch slips and, therefore, it is very difficult to adjust the tension on the springs of the cap applying heads so that said heads will all operate with the uniformity of torque applying pressure in the turning of the caps onto the containers.

The present invention has to do with a device or instrument which may be used for recording the operating torque of the capping machine heads when turning a cap onto a container. Said device includes a body portion 27 on which is mounted for rotation a head 28. The body portion is hollow and a shaft 29 extends from a point adjacent the lower end of the body portion to the upper end thereof. The head is fixed to this shaft by a threaded bolt 30. The body portion has a recess 31 in the upper end thereof which recess is so dimensioned as to form a seat for the outer ring 32 of a ball bearing. The inner ring 33 of the ball bearing is clamped by the head against the end of the shaft and this is the way in which the head is attached to the shaft so as to rotate therewith. The shaft at the lower end thereof has a bolt 34 threaded into the same and the head of the bolt clamps the inner ring 35 of the ball bearing to the shaft. The outer ring 36 is clamped between a collar 37 and a detachable bottom cap 38. The collar 37 engages a shoulder 39 on the inner face of the hollow body portion and the cap, when it is threaded into the bottom of the body portion, clamps the outer ring 36 of the ball bearing against this collar 37 and tightly forces the collar into engagement with the shoulder 39. The shaft 29 is free to rotate in the ball bearing but the collar 37 is clamped tightly and held from rotation. There are notches 40 in this collar 37 which may be engaged by a spanner wrench so that this collar may be turned to different set positions and then clamped in a set position.

There is a collar 41 secured to the shaft 29 by a set screw 42. Encircling the shaft 29 is a spring 43. The spring at its lower end has a projection 44 engaging a recess in the collar 37. This collar serves to anchor the lower end of the spring. The spring at its upper end has a projection which is seated in a recess in the collar 41.

There is a pin 45 carried by the collar 41 and this pin contacts a rib 46 fixed to the body 27. The collar 37 is adjusted so as to put the spring under a slight tension and this will hold the pin 45 in contact with the rib 46. When the shaft 29 is rotated in a clockwise direction as viewed from the upper end thereof, the pin 45 will be moved away from this rib, and thus it is that the spring restrains the turning movements of the shaft 29 and the head 28 attached thereto.

The upper portion of the head 28 is shaped to conform in its outer contour to that of the container or bottle to which screw caps are being attached by the capping machine. There is a flat portion 47 at the upper end of the head which is exactly shaped and sized to conform to the sealing lip on the upper end of the container. As shown in the drawings, the head beneath the lip has a single thread 48 to which a single thread screw cap is adapted to be attached. See Figure 6, where the cap is indicated at c. This screw thread is exactly like the screw thread on the containers to which the capping machine is applying screw caps. There is also a shoulder 49 beneath the thread so that the upper end of this head on the torque indicating device is shaped and sized to conform exactly to the lip, thread and shoulder of the containers to which the screw caps are being attached by the capping machine.

There are many different ways of securing a cap to a container wherein the cap is rotated in order to seal the container. There are multiple thread retaining means and there is a lug type of retaining means. Whatever the retaining means may be, the head 28 of the torque indicating device should be shaped so that the upper outer contour of the head is identically the same as the upper outer contour of the container to which the cap is to be attached.

The body portion of the torque indicating device is provided with an annular upstanding rib 50. This rib has radial openings therethrough indicated at 51, 51, 51. The head 28 has a portion of reduced diameter on its underface which contacts with the inner ring 33 of the ball bearing. The head 28 above this reduced portion overlies the rib 59, but does not contact therewith so as to restrict the rotation of the head 28. Located between this rib 50 and the lower reduced portion of the head 28 is a spring member 52 provided with three lugs 53' which extend outwardly through the openings 51 and bear against the inner face of a collar 53. This collar is mounted between the upper end of the body portion 27 of the torque indicator and it also lies beneath the periphery of the extreme outer portion of the head 28. This ring 53 is frictionally held by these lugs 53' in a set position but can be turned from one set position to another when the frictional contact of the lugs is overcome.

The ring 53 has an annular groove 54 in its upper face. The head 28 carries a pin 55 which extends downward into this groove 54. There is also a pin 56 fixed in the groove and the pin carried by the head contacts with the pin in the groove as shown in Figure 5 when the head has been turned so as to bring the pin 45 into contact with the rib 46 in the body portion of the torque indicating device. This ring 53 is knurled on its outer face as indicated in Figure 4.

There is an indicating pointer 57 carried by the ring 53 which overlies the outer face of the body portion 27, and said body portion is graduated at 58 to indicate the degree of shift of the pointer when a cap is attached to the torque indicating device. These graduations may be made to indicate actual inch pounds torque pressure or it may be an arbitrary arrangement. As shown in the drawings, the scale or recording device is graduated from zero up and the pointer is at zero when the shaft 29 has been rotated by the spring so as to bring the pin 45 into contact with the rib 46. When a cap is screwed onto this head then the pointer will shift to a position determined by the torque pressure at the time when the clutch slips.

Applicant's improved torque recording device may be used in the adjusting of the heads of an automatic capping machine so as to secure the uniformity of tightness of all the containers, assuming that the body 27 of the torque indicating device is of practically the same shape and size as the body of a container and that the overall height of the body and head is also the same as that of the containers to which caps are being attached. Also assuming that the retaining means on the torque testing device is identically the same as that on the container. The torque recording device is placed in one of the capping heads and a cap turned onto the torque recording device by the normal action of a head which has been adjusted so as to turn a cap onto a jar with the desired tightness. During the turning of the cap onto the torque recording device the head 28 of the recording device will turn with the cap attaching head until the clutch slips. This will move the pointer 57 along the indicating scale to a set position. Let us assume that this position is 10 on the scale, then 10 will indicate the desired torque in order to turn the cap onto a container to the desired degree of tightness. The torque indicating device is then placed in the other heads of the automatic capping machine and the heads adjusted so that when the cap is attached thereby to the torque recording device it will bring the pointer to the numeral 10 on the scale 58. It is noted that the pointer will remain in the set position to which it is turned when the cap is attached thereto until the ring is manually turned to bring the indicator back to the zero setting. The improved torque recording device is thus used for setting the capping machine so that each head will turn a cap onto a container with uniform tightness.

Applicant's torque recording device may be used for determining whether the capping machine, after it has been once adjusted so as to screw or turn the caps onto the containers with uniform tightness, continues to maintain such adjustment throughout a day's run. Inasmuch as the torque recording device is shaped to conform to the body of the container being capped it can be placed in a feed line of the containers and pass through the machine with the containers during the operation of the machine. A cap will be screwed onto the torque recording device with the same torque pressure that is being applied by the head being tested when turning a cap onto a container. The torque recording device is taken out of the line and examined and the pointer will indicate the torque at which the head is operated. If it is below 10 then the head should be adjusted to bring it up to the proper tightness of the original setting. If it is above 10 then it likewise should be adjusted, for screwing the cap onto the container to an overtight setting may make it very difficult to remove and perhaps damage the cap or the threads.

If the machine is operating upon large size containers, that is, containers larger than the body of the torque recording device, then a dummy body 59 may be used, which body is of the same size as the container body. This body has a recess 60 centrally thereof, which receives the body 27 of the indicating device. Screws 61, 61 carried by this dummy body are turned into contact with the body 27 so that when the dummy body is gripped by the holding jaws 4 and 5 of the capping machine, the body 27 of the torque recording device will be held from turning.

The improvement resides not only in the torque indicating device for setting the heads so as to operate with a uniform degree of torque, but it is also used for determining whether the machine is operating throughout the day with the same uniform degree of torque. It is obvious that many changes may be made in the details of construction without departing from the spirit of the invention as set forth in the appended claims.

I claim:

1. A torque indicating device for a capping machine for turning caps onto containers, comprising a body member adapted to be held from turning in a capping machine, a rotatable head mounted on said body member having a cap retaining means structurally identical with the cap retaining means on a container, spring means for resisting the turning movement of said head, said retaining means on said head being adapted to receive a cap applied thereto by the chuck of the capping machine, and a torque indicating means carried by the body of said device and rotated by said head to a set position determined by the maximum torque applied to said cap by said chuck.

2. A torque indicating device for a capping machine for turning caps onto containers, comprising a body member adapted to be held from turning in a capping machine, a rotatable head mounted on said body member having a cap retaining means structurally identical with the cap retaining means on a container, spring means for resisting the turning movement of said head, said retaining means on said head being adapted to receive a cap applied thereto by the chuck of the capping machine, a torque indicating means carried by the body of said device and rotated by said head to a set position determined by the maximum torque applied to said cap by said chuck, friction means for retaining the indicating means in said set position and manually operated means whereby said indicating means may be returned to initial position.

3. A torque indicating device for a capping machine for turning caps onto containers, comprising a body member adapted to be held from turning in a capping machine, a rotatable head mounted on said body member having a cap retaining means structurally identical with the cap retaining means on a container, spring means for resisting the turning movement of said head, said retaining means on said head being adapted to receive a cap applied thereto by the chuck of the capping machine, a torque indicating ring disposed between said head and said body concentric with the axis of rotation of said head, means carried by said head and engaging said ring for turning the same to a set position when the head is turned during the securing of the cap to the head, and friction means for retaining the ring in said set position when the head returns to an initial position.

4. A torque indicating device for a capping machine for turning caps onto containers, comprising a body member adapted to be held from turning in a capping machine, a rotatable head mounted on said body member having a cap retaining means structurally identical with the cap retaining means on a container, spring means for resisting the turning movement of said head, said retaining means on said head being adapted to receive a cap applied thereto by the chuck of the capping machine, a torque recording ring disposed between said head and said body concentric with the axis of rotation of said head, means carried by said head and engaging said ring for turning the same to a set position when the head is turned during the securing of the cap to the head, friction means for retaining the ring in said set position when the head returns to an initial position, and manually operated means whereby the ring may be returned to initial position.

5. A torque indicating device for a capping machine for turning caps onto containers, comprising a body member adapted to be held from turning in a capping machine, a rotatable head mounted on said body member having a cap retaining means structurally identical with the cap retaining means on a container, spring means for resisting the turning movement of said head, said retaining means on said head being adapted to receive a cap applied thereto by the chuck of the capping machine, a torque indicating ring disposed between said head and said body concentric with the axis of rotation of said head, means carried by said head and engaging said ring for turning the same to a set position when the head is turned during the securing of the cap to the head, friction means for retaining the ring in said set position when the head returns to an initial position, and manually operated means whereby the ring may be returned to initial position, a pointer carried by said ring and a scale carried by said body and indicating the torque pressure required to secure the cap to the recording device.

LINDSAY T. CRABBE.

REFERENCES CITED

The following references are of record in the file of this patent:

UNITED STATES PATENTS

| Number | Name | Date |
|---|---|---|
| 774,931 | Bucknam | Nov. 15, 1904 |
| 2,152,541 | Galpin et al. | Mar. 28, 1939 |
| 2,279,698 | Weckerly | Apr. 14, 1942 |
| 2,300,288 | Hullhorst | Oct. 27, 1942 |
| 2,337,951 | Whitehead | Dec. 28, 1943 |
| 2,392,260 | Piatt et al. | Jan. 1, 1946 |
| 2,503,649 | Zimmerman | Apr. 11, 1950 |

FOREIGN PATENTS

| Number | Country | Date |
|---|---|---|
| 900,957 | France | Oct. 23, 1944 |